(12) United States Patent
Shin

(10) Patent No.: US 8,054,506 B2
(45) Date of Patent: Nov. 8, 2011

(54) IMAGE FORMING APPARATUS AND IMAGE QUALITY ENHANCEMENT METHOD THEREOF

(75) Inventor: Sang-youn Shin, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 799 days.

(21) Appl. No.: 12/023,147

(22) Filed: Jan. 31, 2008

(65) Prior Publication Data

US 2009/0021792 A1 Jan. 22, 2009

(30) Foreign Application Priority Data

Jul. 19, 2007 (KR) .................. 10-2007-0072137

(51) Int. Cl.
 *G06K 15/00* (2006.01)
(52) U.S. Cl. .................. 358/3.15; 358/3.12; 358/3.27
(58) Field of Classification Search ............... 382/254, 382/266, 269; 358/1.1, 1.9, 3.06, 3.09, 3.12, 358/3.15, 3.27, 534, 353, 536
See application file for complete search history.

(56) References Cited

U.S. PATENT DOCUMENTS

| 5,465,157 A * | 11/1995 | Seto et al. ............... 358/3.15 |
| 5,905,579 A * | 5/1999 | Katayama et al. ............. 358/296 |
| 2005/0141037 A1* | 6/2005 | Shin ........................... 358/3.15 |

FOREIGN PATENT DOCUMENTS

KR 10-0538244 12/2005

* cited by examiner

*Primary Examiner* — Thomas D Lee
(74) *Attorney, Agent, or Firm* — Staas & Halsey LLP

(57) ABSTRACT

An image forming apparatus provides enhancement of image quality. The image forming apparatus includes a window generating unit to generate a main window of a predetermined size using a Lines Per Inch (LPI) and an angle of a dithering mask, and to generate a plurality of subwindows within the generated main window, a determining unit to determine the presence of an edge area by applying the plurality of generated subwindows to a binary image and according to pixel values of the binary image that correspond to the subwindows, and a control unit to determine a dot size of a central reference pixel at the center of the main window, according to the presence and absence of the edge area. Because image quality is enhanced adaptively according to edge and smooth areas, print quality improves.

23 Claims, 14 Drawing Sheets

IMAGE FORMING APPARATUS AND IMAGE QUALITY ENHANCEMENT METHOD THEREOF

CROSS-REFERENCE TO RELATED APPLICATION

This application claims the benefit of Korean Application No. 2007-72137, filed in the Korean Intellectual Property Office on Jul. 19, 2007, the disclosure of which is incorporated herein by reference.

BACKGROUND OF THE INVENTION

1. Field of the Invention

Aspects of the present invention relate generally to an image forming apparatus and an image quality enhancement method thereof, and more particularly, to an image forming apparatus and an image quality enhancement method thereof that improves image quality by determining the presence or absence of an edge area based on the pattern comparison between a plurality of subwindows, and determining a dot size of a center reference pixel depending on the presence or absence of the edge area.

2. Description of the Related Art

Generally, a monochrome laser printer or a color laser printer conducts gray representation to express an image, dividing one pixel into a plurality of subpixels. It takes a considerable amount of data to process one pixel based on a plurality of gray levels (multi-gray-levels). Increased amount of data results in an increased time to transmit the data from a computer to a laser printer and in a requirement for increased memory capacity. Accordingly, halftoning is used to mitigate this problem. In halftoning, pixels are generally processed to be on or off, in one-bit processing.

However, because the halftoning simply represents dots or pixels in on or off states, images still tend to look rough. The problem is more severe in relatively bright regions. A 1-bit-gray processing has been adopted to deal with such problems. A method to generate multi-levels of data from 1-bit data is disclosed in several previous publications, including Korean Patent Registration No. 0538244 and US Patent Publication No. 2005-0141037. These publications generally disclose a method to determine whether a window is an edge area, and if not, to generate a level according to the number of dots of the surrounding pixels. This method will be explained in detail below with reference to FIG. 1.

As shown in FIG. 1, a dithering mask, an LPI (lines per inch) and an angle of the dithering mask, and a binary image are input at operation S110. A window of a predetermined size is created based on these input values at operation S120, and the presence of an edge area is determined at operation S130. Based on the pixels of a binary image where a window is applied, a maximum value is detected from among the dithering mask values of a white region where there is no dot printed, and a minimum value is detected from among the dithering mask values of a black region where there is dots printed.

A smooth area is determined if the maximum value of the white region is greater than the minimum value of the black region. An edge area is determined if the maximum value of the white region is greater than the minimum value of the black region, and if a difference between the two values is greater than a threshold. A smooth area is determined if the difference between the maximum value of the white region and the minimum value of the black region is less than the threshold.

Image enhancement is performed with respect to the smooth area at operation S140, and dot size is determined at operation S150. Accordingly, a pulse signal is applied to the LSU at operation S160 according to the determined dot size. No image enhancement is performed if the edge area is detected at operation S130.

As described above, a conventional image forming apparatus requires a dithering mask to determine the presence of an edge area. In a color representation, a plurality of dithering masks are required to correspond to respective colors, so it consumes significant memory resources. Furthermore, because images are enhanced only on the smooth areas, edges sometimes appear fuzzy depending on the dot pattern. Therefore, brightness adjustment is required to take the characteristics of edge area into consideration

SUMMARY OF THE INVENTION

Aspects of the present invention provide an image forming apparatus and an image quality enhancement method thereof that improves image quality by determining the presence of an edge area based on the pattern comparison between a plurality of subwindows, and determining dot sizes of center reference pixels depending on the presence or absence of the edge area.

Another aspect of the present invention provides an image forming apparatus and an image quality enhancement method thereof to reduce the use of dithering masks to express different colors, and to subsequently reduce the use of memory resources, by determining the presence of an edge area based on the pattern comparison between subwindows applied to the binary data, instead of using dithering masks.

According to an aspect of the present invention, an image forming apparatus is provided. The image forming apparatus includes a window generating unit to generate a main window of a predetermined size according to a Lines Per Inch (LPI) and an angle of a dithering mask within a binary image to be formed, and to generate a plurality of subwindows within the main window, a determining unit to detect whether the main window has an edge area of the binary image by applying the plurality of generated subwindows to the binary image and according to pixel values of the binary image that correspond to the subwindows, and a control unit to determine a dot size of a central reference pixel at the center of the main window, according to a presence or absence of the edge area as detected by the determining unit.

According to another aspect of the present invention, the determining unit includes a pattern determining unit to determine whether the pixel values of the binary image are uniform at the corresponding pixel locations in the plurality of subwindows, and an area determining unit to determine the presence of an edge area if a number of the pixel locations having the same pixel value in the subwindows is less than a predetermined threshold, and to determine the presence of a smooth area in the subwindows if the number of the pixel locations having the same pixel value is higher than the predetermined threshold.

According to another aspect of the present invention, the window generating unit includes a main window generating unit to generate the main window, a location detecting unit to detect the locations of surrounding reference pixels around the central reference pixel located within the main window, using the LPI and the angle, and a subwindow generating unit to generate the subwindows having a predetermined size centered around the detected location of the surrounding reference pixels and the location of the central reference pixel, the subwindows being sized so as not to overlap with each other.

According to another aspect of the present invention, the control unit includes a pattern detecting unit to compare pixel values of the pixel locations belonging to a first subwindow that includes the location of the central reference pixel to pixel values of the pixel locations belonging to the second subwindows that include the locations of the surrounding reference pixels, except for the locations of the reference pixels in each subwindow, and to detect the subwindows having the same pattern, if the binary image corresponding to the main window is determined to be an have the edge area, and a dot size determining unit to determine a dot size of the location of the central reference pixel according to the pixel value of the binary image that corresponds to the location of the central reference pixel or the locations of the surrounding reference pixels included in the detected subwindows.

According to another aspect of the present invention, the dot size determining unit includes a first computing unit to compute a number (Wbn) of the plurality of subwindows that include a dot-forming pixel value at the central reference pixel and the surrounding reference pixels, a second computing unit to compute a total number (Wn) of subwindows within the main window, and a third computing unit to compute a dot size of the central reference pixel using the formula Wbn/Wn.

According to another aspect of the present invention, the location of the central reference pixel is at the center of the first subwindow, and the locations of the surrounding reference pixels are at the centers of the corresponding second subwindows.

According to another aspect of the present invention, the control unit includes a first computing unit to compute a number (Pbn) of reference pixels having a dot-forming pixel value at the detected central reference pixel and surrounding reference pixels, if a binary image corresponding to the main window is determined to be a smooth area of the binary image as opposed to the edge area, a second computing unit to compute a total number (Pn) of subwindows within the main window, and a third computing unit to compute a dot size of the central reference pixel using the formula Pbn/Pn.

According to another aspect of the present invention, an image quality enhancement method includes receiving a binary image and Lines Per Inch (LPI) and an angle of a dithering mask, generating a main window of a predetermined size within the binary image using the received LPI and angle, and generating a plurality of subwindows within the generated main window, determining if the main window includes an edge of the binary image by applying the plurality of generated subwindows to a binary image and according to pixel values of the binary image corresponding to the subwindows, and determining a dot size of a central reference pixel at the center of the main window, according to whether it is determined that the main window includes the edge area.

According to another aspect of the present invention, the determining the presence of an edge area includes determining whether the pixel values of the binary image are uniform at the corresponding pixel locations included in the plurality of subwindows, and determining the presence of the edge area if a number of the pixel locations having the same pixel value in the subwindows is less than a predetermined threshold, and determining the presence of a smooth area if the number of the pixel locations having the same pixel value in the subwindows is higher than the predetermined threshold.

According to another aspect of the present invention, the generating of the main window includes generating the main window, detecting the locations of surrounding reference pixels around the central reference pixel located within the main window, using the received LPI and angle, and generating subwindows of a predetermined size that are centered around the detected location of the surrounding reference pixels and the location of the central reference pixel, the subwindows being sized so as not to overlap with each other.

According to another aspect of the present invention, the generating of the subwindows includes comparing pixel values of the pixel locations belonging to a first subwindow that includes the location of the central reference pixel to the pixel locations belonging to second subwindows that include the locations of the surrounding reference pixels, except for the locations of the reference pixels in each subwindow, and to detect the subwindows having the same pattern, if a binary image corresponding to the main window is determined to have the edge area, and determining a dot size of the location of the central reference pixel according to the pixel value of the binary image corresponding to the location of the central reference pixel or the locations of the surrounding reference pixels included in the detected subwindows.

According to another aspect of the present invention, the determining a dot size includes computing a number (Wbn) of subwindows that include a dot-forming pixel value at the central reference pixel and the surrounding reference pixels, computing a total number (Wn) of subwindows within the main window, and computing a dot size of the central reference pixel using a mathematical formula, Wbn/Wn.

According to another aspect of the present invention, the location of the central reference pixel is the center of the first subwindow, and the locations of the surrounding reference pixels are the centers of the corresponding second subwindows.

According to another aspect of the present invention, the subwindow generating includes computing a number (Pbn) of reference pixels having a dot-forming pixel value at the detected central reference pixel and surrounding reference pixels, if a binary image corresponding to the main window is determined to be a smooth area of the binary image as opposed to the edge area, computing a total number (Pn) of subwindows within the main window, and computing a dot size of the central reference pixel using the formula Pbn/Pn.

According to another aspect of the present invention, an image forming apparatus includes a video controller to apply a plurality of windows to a binary image to be printed, to determine the presence of an edge area in each window according to binary image pixel values corresponding to the subwindows, and to determine a dot size of a reference pixel according to he determination as to whether the window includes the edge area, and an engine unit to express the binary image on a multi-graylevel by printing the binary image according to the determined dot size.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects of the embodiments, taken in conjunction with the accompanying drawings of which.

DETAILED DESCRIPTION OF THE EMBODIMENTS

Figure 1:
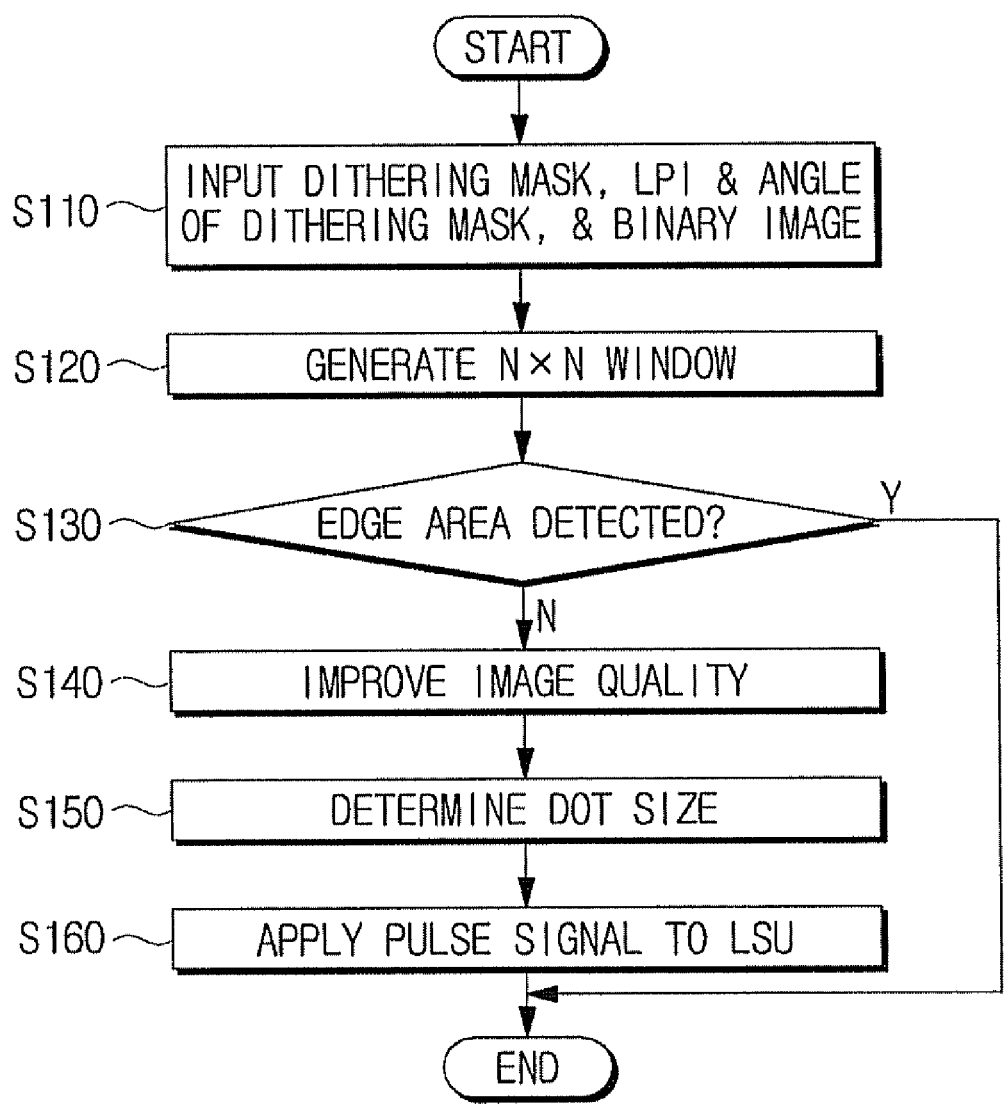
FIG. 1 is a flowchart to explain a method for enhancing image quality of a conventional image forming apparatus.

Reference will now be made in detail to the present embodiments, examples of which are illustrated in the accompanying drawings, wherein like reference numerals refer to the like elements throughout. The embodiments are described below in order to explain the present invention by referring to the figures.

Figure 2:
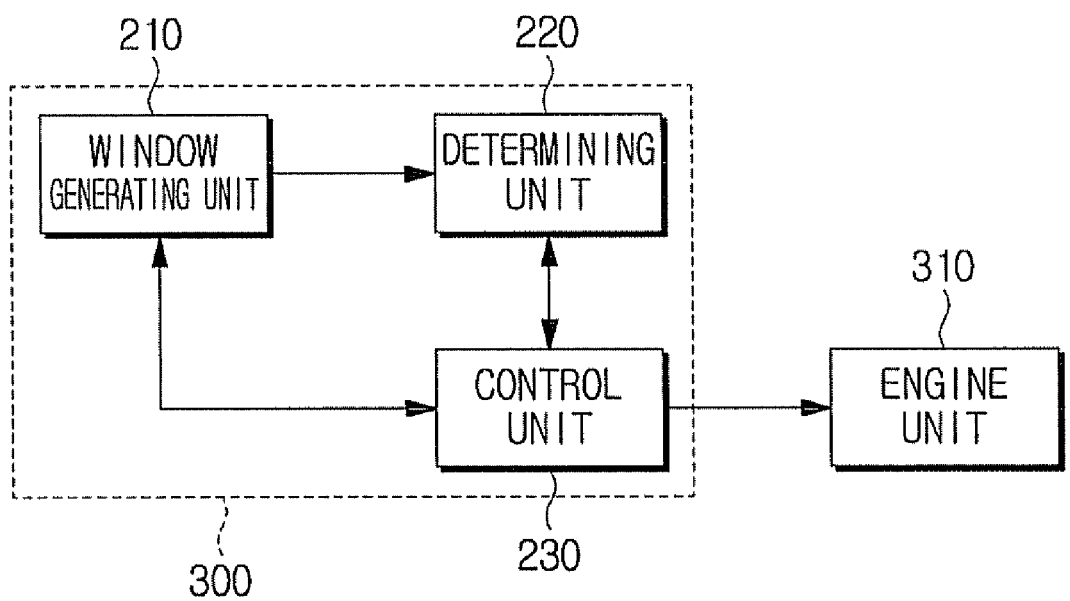
FIG. 2 is a block diagram of an image forming apparatus according to an embodiment of the present invention.

FIG. 2 is a block diagram of an image forming apparatus 200 according to an embodiment of the present invention. The image forming apparatus 200 includes a video controller 300 having a window generating unit 210, a determining unit 220, and a control unit 230. The image forming apparatus 200 also includes an engine unit 310. According to other aspects of the invention, the image forming apparatus may include additional and/or different units. Similarly, the functionality of two or more of the above units may be combined into a single component. The image forming apparatus 200 may be, for example, a printer, a facsimile machine, a copier, or a multi-function device The window generating unit 210 generates a N×M main window using a Lines Per Inch (LPI) and an angle of a dithering mask, and generates a plurality of subwindows within the generated main window. The main window is used to detect the location of a reference pixel in the window using the input LPI and angle.

The LPI, or lines per inch, represents the screen frequency, which is expressed by the number of lines per inch. The "angle" refers to the angle between reference pixels to be generated. More specifically, the "angle" refers to a clockwise or counterclockwise angle created with reference to either an X or Y axis, each crossing the central reference pixel in perpendicular relation with the other. The locations of surrounding reference pixels are determined with reference to the central reference pixel and in consideration of the LPI based on the input angle.

The window generating unit 210 generates a plurality of subwindows with reference to based on each of the reference pixels. The subwindows are sized so as not to overlap each other, but need not be so sized in all aspects.

The determining unit 220 applies the plurality of subwindows generated at the window generating unit 210 to a binary image, and determines the presence of an edge according to the binary image pixel value that corresponds to each of the subwindows. An edge area may be determined based on whether the patterns of the pixel values of the subwindows match. A dithering mask is not required in this process.

The control unit 230 may apply a process for determining dot sizes differently, depending on the determination of the determining unit 220. The control unit 230 determines the dot size of the central reference pixel of the main window based on the patterns of the subwindows and the pixel values of the reference pixels of each of the sub windows, if the determining unit 220 determines the presence of an edge area. If the determining unit 220 determines the presence of a smooth area (i.e., not the edge area), however, the control unit 230 determines the dot size of the central reference pixel based on the pixel values of the central reference pixel and surrounding reference pixels.

The engine unit 310 carries out printing based on the dot size as determined by the control unit 230. As a result, an input binary image is expressed as a multi-gray-level image, with improved characteristics both in the edge and smooth areas. An edge area is expressed with increased clarity, and a smooth area is expressed more smoothly.

Figure 3:
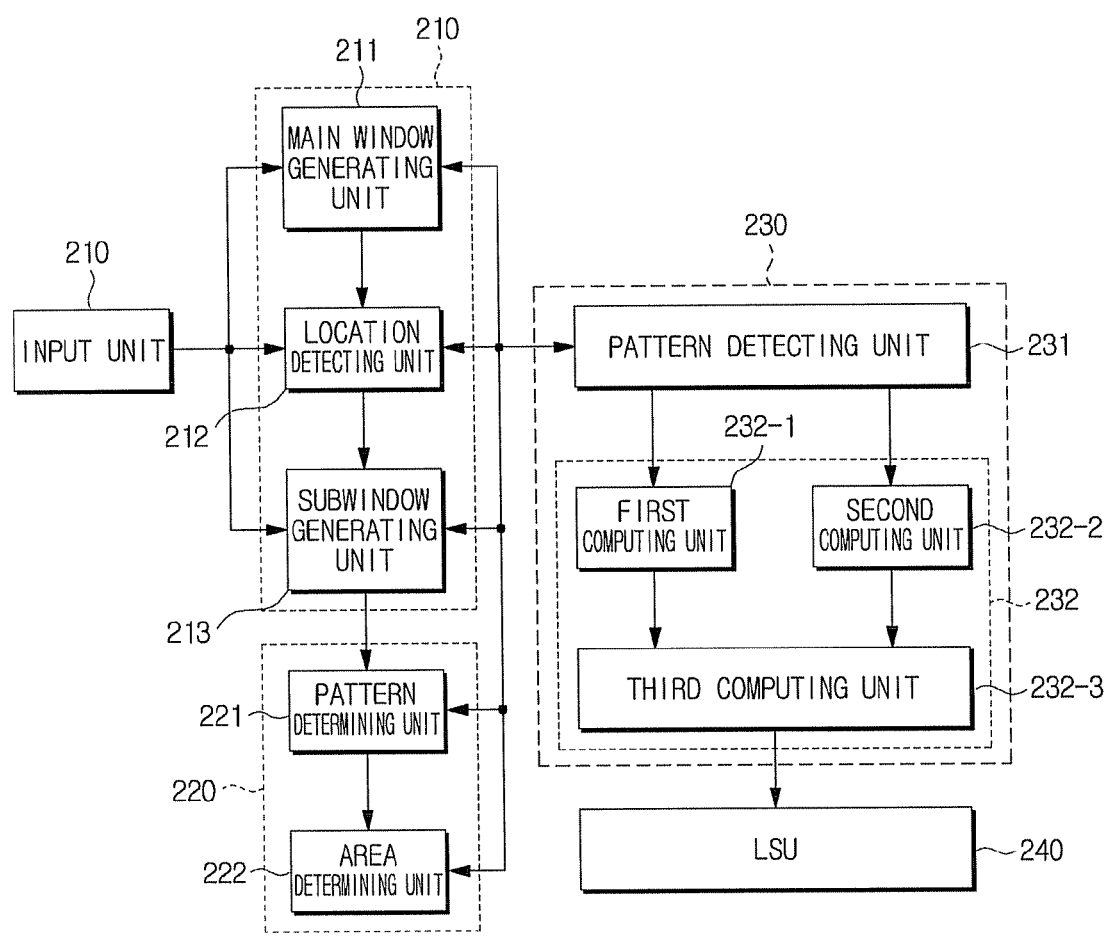
FIG. 3 is a detailed block diagram of the image forming apparatus of FIG. 2.

FIG. 3 is a detailed block diagram of the image forming apparatus of FIG. 2 according to an embodiment of the present invention. Although not required in all aspects, as shown in FIG. 3, the image forming apparatus 200 an LSU 240 and an input unit 250. The LSU 240 may be a component of the engine unit 310.

The window generating unit 210 includes a main window generating unit 211, a location detecting unit 212, and a subwindow generating unit 213. The determining unit 220 includes a pattern determining unit 221 and an area determining unit 222. The control unit 230 includes a pattern detecting unit 231 and a dot determining unit 232. The dot determining unit 232 includes a first computing unit 232-1, a second computing unit 232-2, and a third computing unit 232-3.

The input unit 250 receives print data, and LPI and angle of a dithering mask, such as from a computer or other device requesting a print job. The LIP and the angle are considered in the designing stage of a screen. These values may be set at the factory or input by a designer.

The window generating unit 210 generates a main window and a plurality of subwindows according to the LPI and angle input through the input unit 250. The structure of the window generating unit 210 and the process of generating a window will be explained below with reference to FIG. 4.

Figure 4:
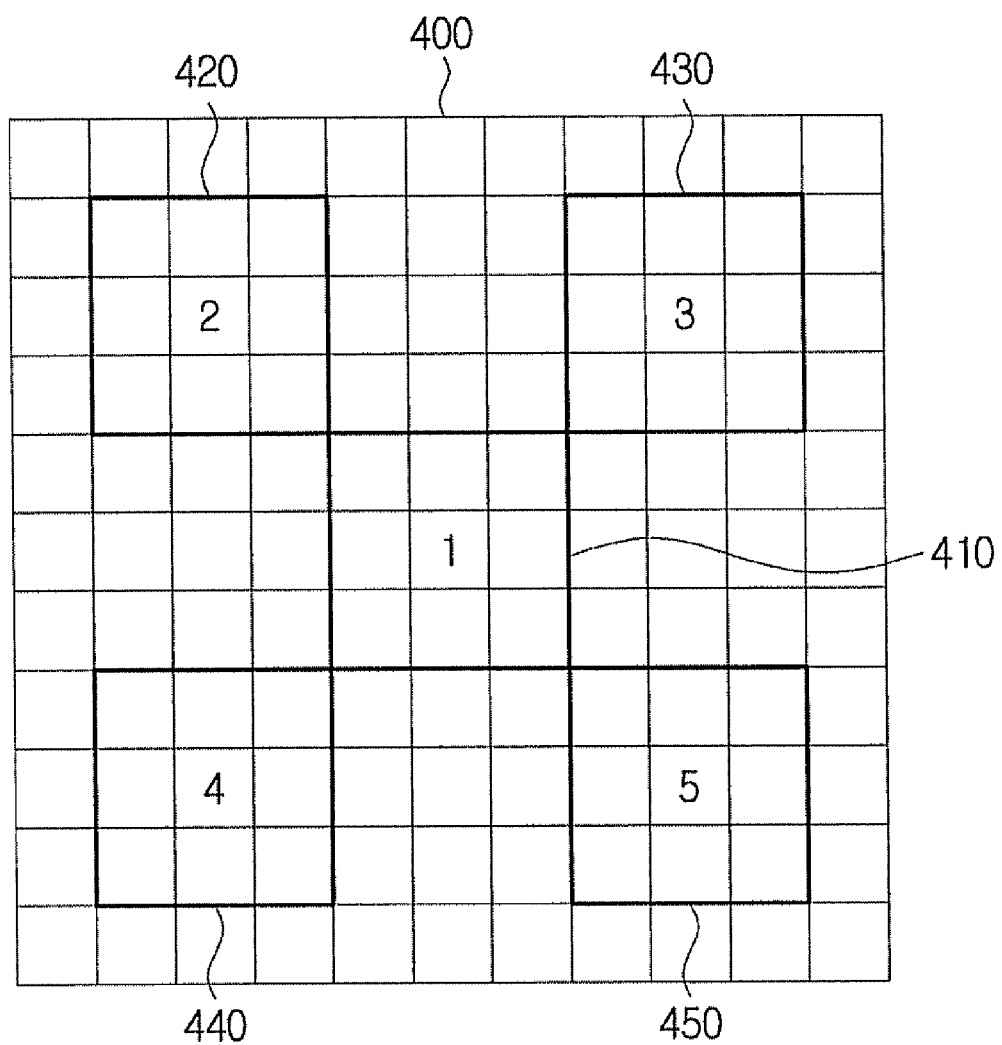
FIG. 4 illustrates a process of generating a window according to an embodiment of the present invention.

FIG. 4 explains a process of generating a window according to an embodiment of the present invention. The main window generating unit 211 generates an N×M main window 400, based on the LPI and the angle. An example shown in FIG. 4 will be explained in greater detail, where the resolution is 600 dpi, LPI is 141, and angle is 45 degrees. FIG. 4 shows an 11×11 main window 400. While N and M are described as equal with respect to FIG. 4, it is understood that N need not equal M in all aspects.

The location detecting unit 212 detects locations 2 to 5 of the surrounding reference pixels according to the LPI and the angle, with reference to the location 1 of the central reference pixel located within the main window 400. The subwindow generating unit 213 generates subwindows 410 to 450 based on the detected locations 2 to 5 of the surrounding reference pixels and the location 1 of the central reference pixel. FIG. 4 shows 3×3 pixel subwindows 410, 420, 430, 440, and 450. The subwindows may be sized so as not to overlap with each other, but need not be 3×3, and need not have equal sides as in the example shown. The pattern determining unit 221 determines whether each of the pixel locations included in the plurality of subwindows has the same pixel value.

The area determining unit 222 determines an edge area based on the determination of the pattern determining unit 221. The area determining unit 222 detects the number of pixel locations having the same value, and determines an edge area if the detected number of pixel locations is less than a predetermined threshold, or determines a smooth area if the detected number of pixel locations is greater than the predetermined threshold. Determining an edge area by the determining unit 220 will be explained in greater detail below with reference to FIGS. 5A and 5B.

Figure 5A:
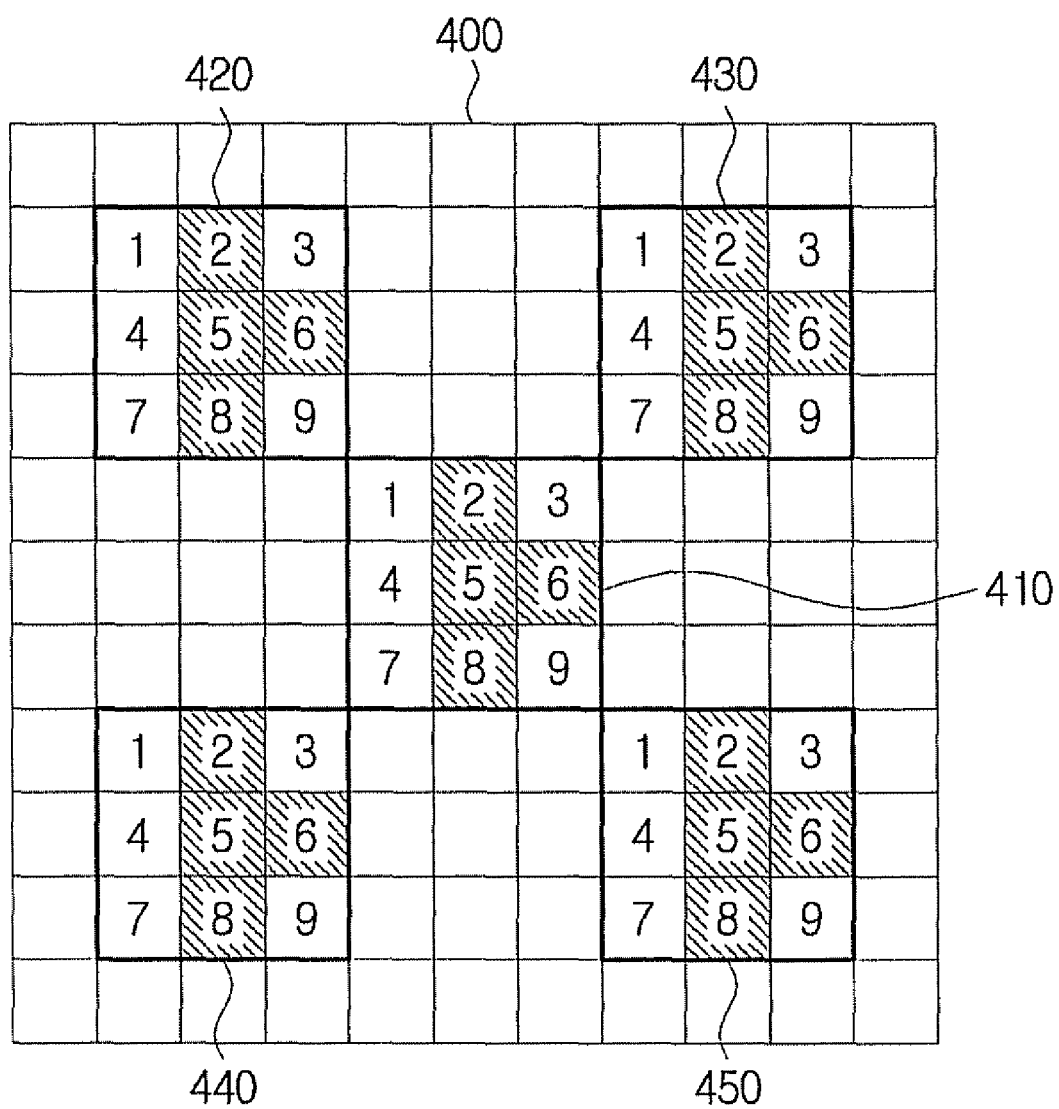
FIGS. 5A and 5B illustrate a process of determining the presence of edge area according to an embodiment of the present invention.
Figure 5B:
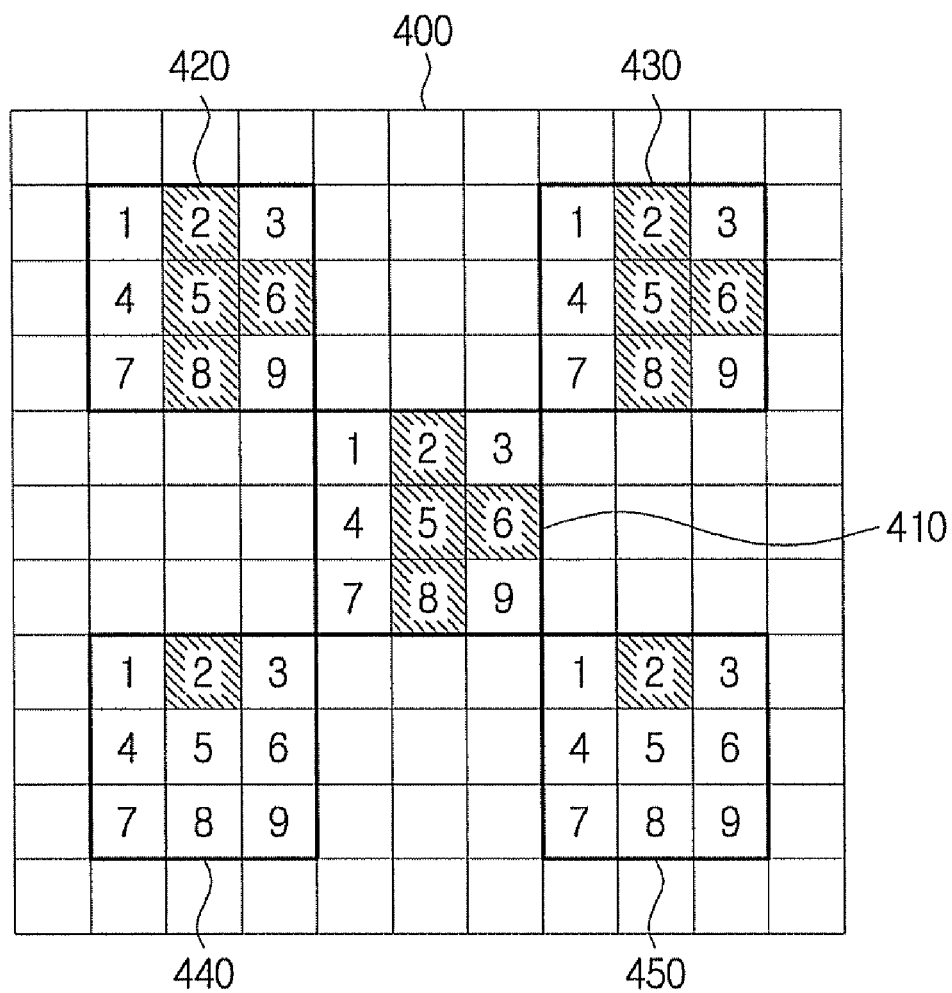

FIGS. 5A and 5B explain a process of determining the presence of edge area according to an embodiment of the present invention. FIGS. 5A and 5B show pixel locations of each of the subwindows 410 to 450.

The pattern determining unit 221 determines whether the corresponding pixel locations of a binary image have a value of 0 or 1. For example, FIG. 5A shows a pattern in which each of the subwindows 410 to 450 has the same pixel value. Accordingly, all the subwindows 410 to 450 have a value of 0 at pixel locations 1, 3, 4, 7, 9, indicating that a dot is not formed and so a white region is represented at these locations. The subwindows 410 to 450 have a value of 1 at pixel locations 2, 5, 6, 8, indicating that a dot is formed and so a black region is represented at these locations. Accordingly, the area determining unit 222 determines that the nine pixel locations match. If a predetermined threshold is 8, because the number of matches is higher than the predetermined threshold, the binary image applied to the main window 400 of FIG. 5A can be determined as a smooth area.

FIG. 5B shows a pattern in which the subwindows 410 to 450 have a value of 0 at pixel locations 1, 3, 4, 7, 9, indicating that a dot is not formed there, and have a value of 1 at pixel location 2, indicating the presence of a dot. Accordingly, the area determining unit 222 determines that six pixel locations match. Because the number of matches is less than the predetermined threshold 8, the binary image applied to the main window is determined to be an edge area.

The control unit 230 determines the dot size of the central reference pixel, with varying the dot size depending on edge and smooth areas. If a binary image corresponding to the main window 400 is determined to be an edge area, the pattern detecting unit 230 compares pixel values of respective pixel locations belonging to a first subwindow 410 that includes the location of the central reference pixel to pixel values of pixel locations belonging to second subwindow 420 to 450 that include the locations of the surrounding reference pixels, except for the reference pixels, to thus detect the subwindows that have the same pattern. The dot size determining unit 232 determines the dot size of the location of the central reference pixel according to the pixel values of the binary image corresponding to the location of the central reference pixel or the locations of the surrounding reference pixels included in the detected subwindows 410 to 450.

The dot size determining unit 232 includes a first computing unit 232-1, a second computer unit 232-2, and a third computing unit 232-3. The first computing unit 232-1 computes a number (Wbn) of subwindows that include the central reference pixel and surrounding reference pixels that have a dot-forming pixel value. The second computing unit 232-2 computes a total number (Wn) of the subwindows located within the main window. The third computing unit 232-3 computes a dot size of the central reference pixel using a mathematical formula, Wbn/Wn. The third computing unit 232-3 applies a pulse signal corresponding to the computed dot size to the LSU 240. The LSU 240 generates an area to print by turning on or off a laser according to the applied pulse signal.

Figure 6A:
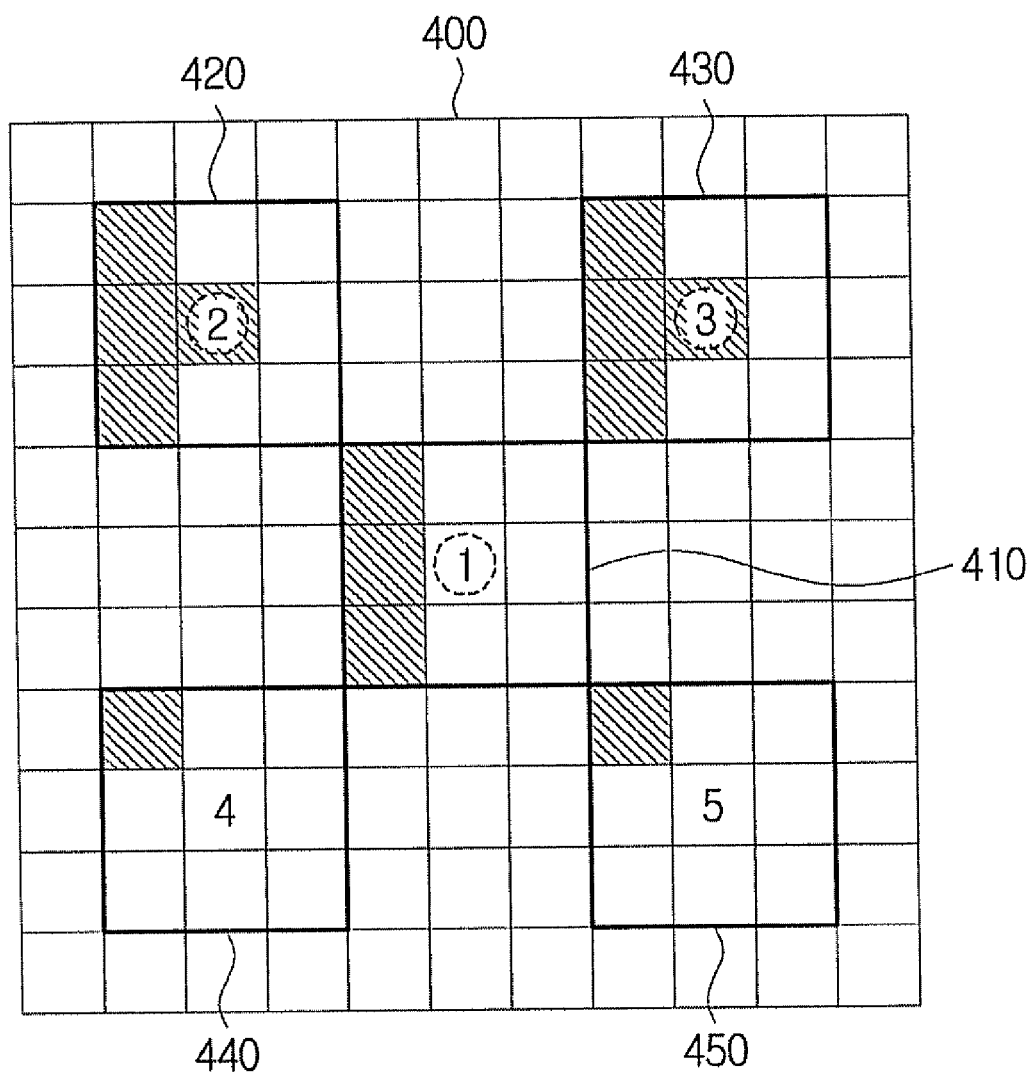
FIGS. 6A, 6B, 7A, and 7B illustrate a process of enhancing image quality of an edge area according to an embodiment of the present invention.

Determining a dot size of an edge area by the control unit 230 will be explained in greater detail with reference to FIGS. 6A to 7B. FIG. 6A shows the pattern of the main window 400 and subwindows 410 to 450 included in the main window 400 in the binary image that is determined to be an edge area. In FIG. 6A, the central reference pixel 1 is 0, indicating a white region.

Based on the first subwindow 410 that includes the location 1 of the central reference pixel and the second subwindows that include locations 2, 3, 4, 5 of the surrounding reference pixels, pixel values of all the pixel locations are compared, except for the reference pixels 1, 2, 3, 4, 5, to detect the subwindows of same pattern.

Figure 6B:
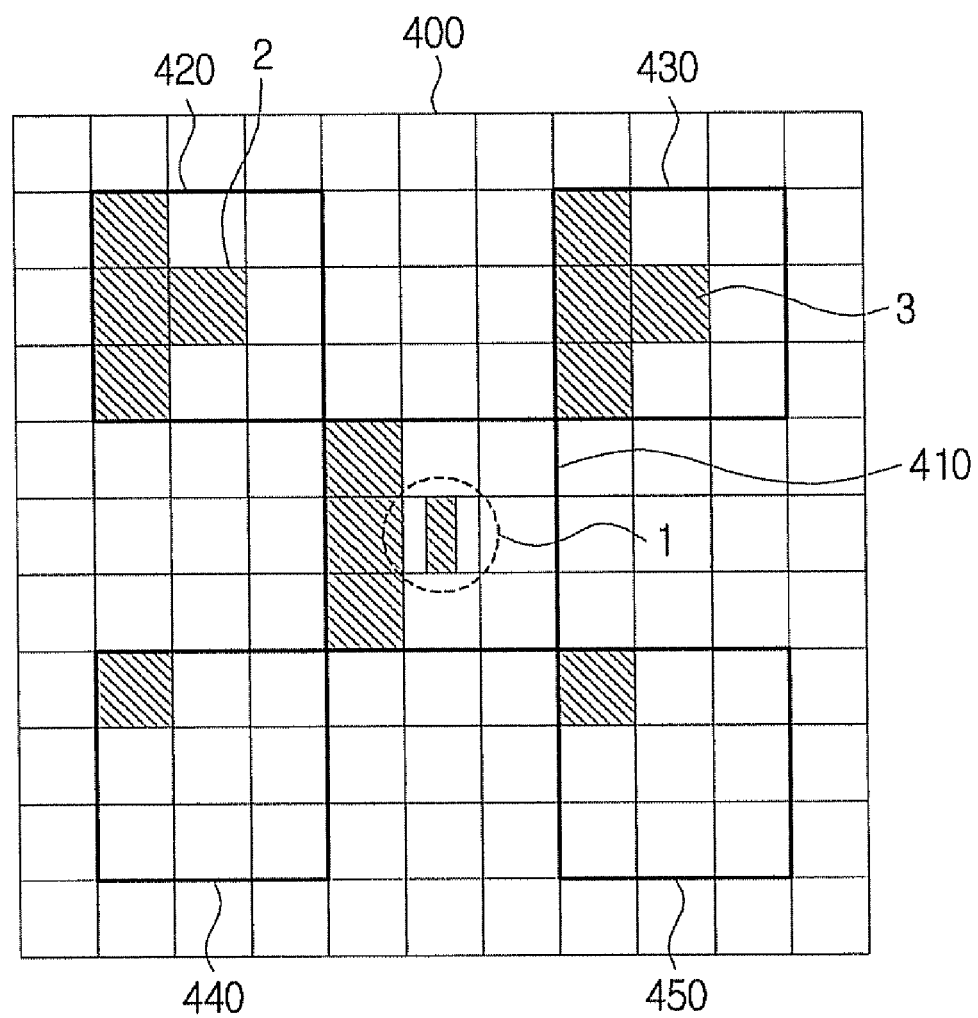

In the main window 400 shown in FIG. 6A, the first subwindow 410 and the second subwindows 420 and 430 have the same pattern (not counting the pixels at locations 1, 2, and 3). FIG. 6B shows the result derived from FIG. 6A. The central reference pixel 1 of a binary image having the pixel pattern as shown in FIG. 6A forms dots as shown in FIG. 6B. In FIG. 6B, two subwindows 420 and 430 have a pixel value of 1 that forms a dot, among the reference pixels 1, 2, 3 located within the subwindows 410, 420, and 430 having the same pattern. Considering that the main window 400 has five subwindows 410 to 450, the central reference pixel has a dot size of ⅖. A gray level may be adjusted by applying the weight of ⅖.

Figure 7A:
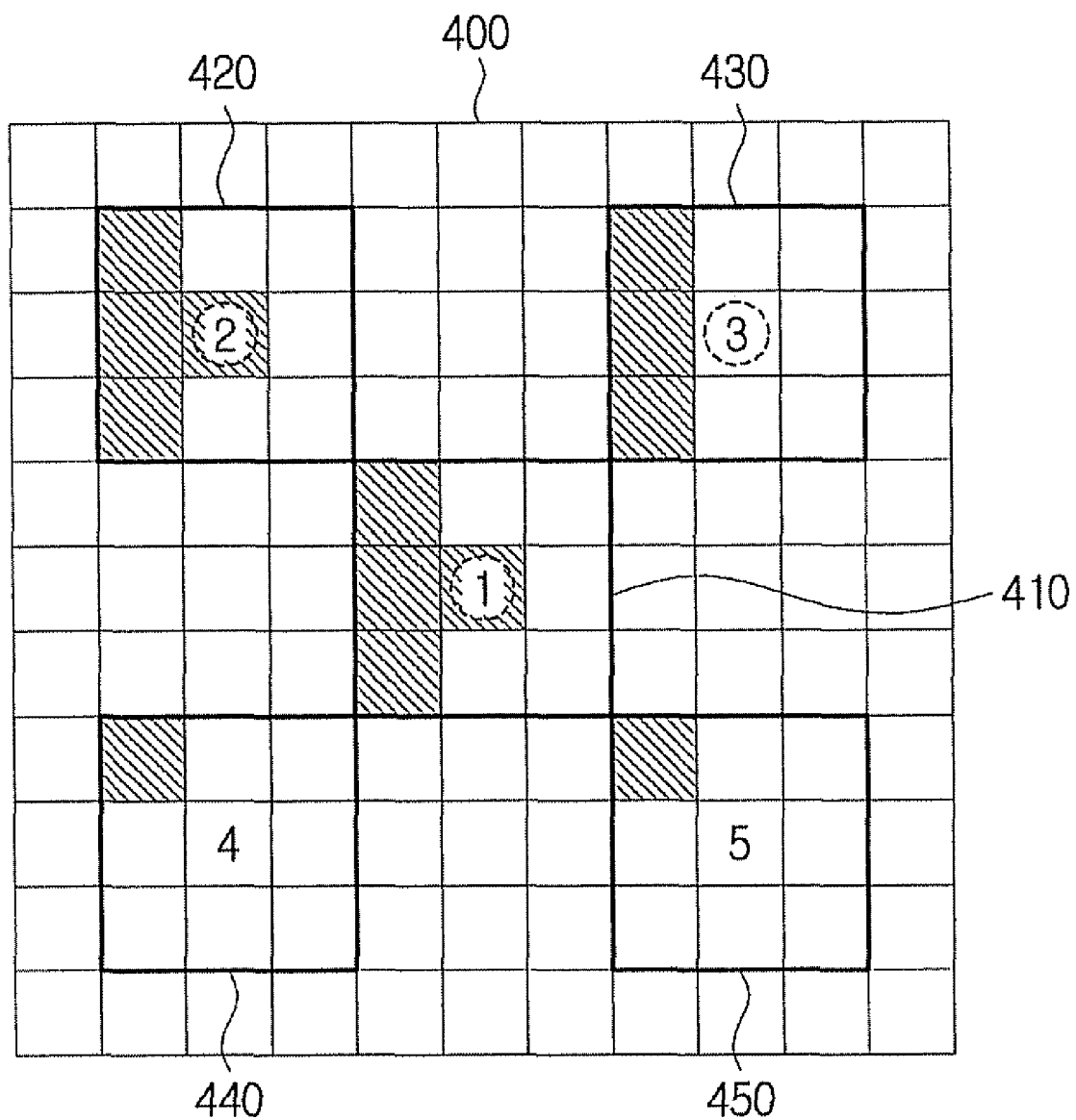
Figure 7B:
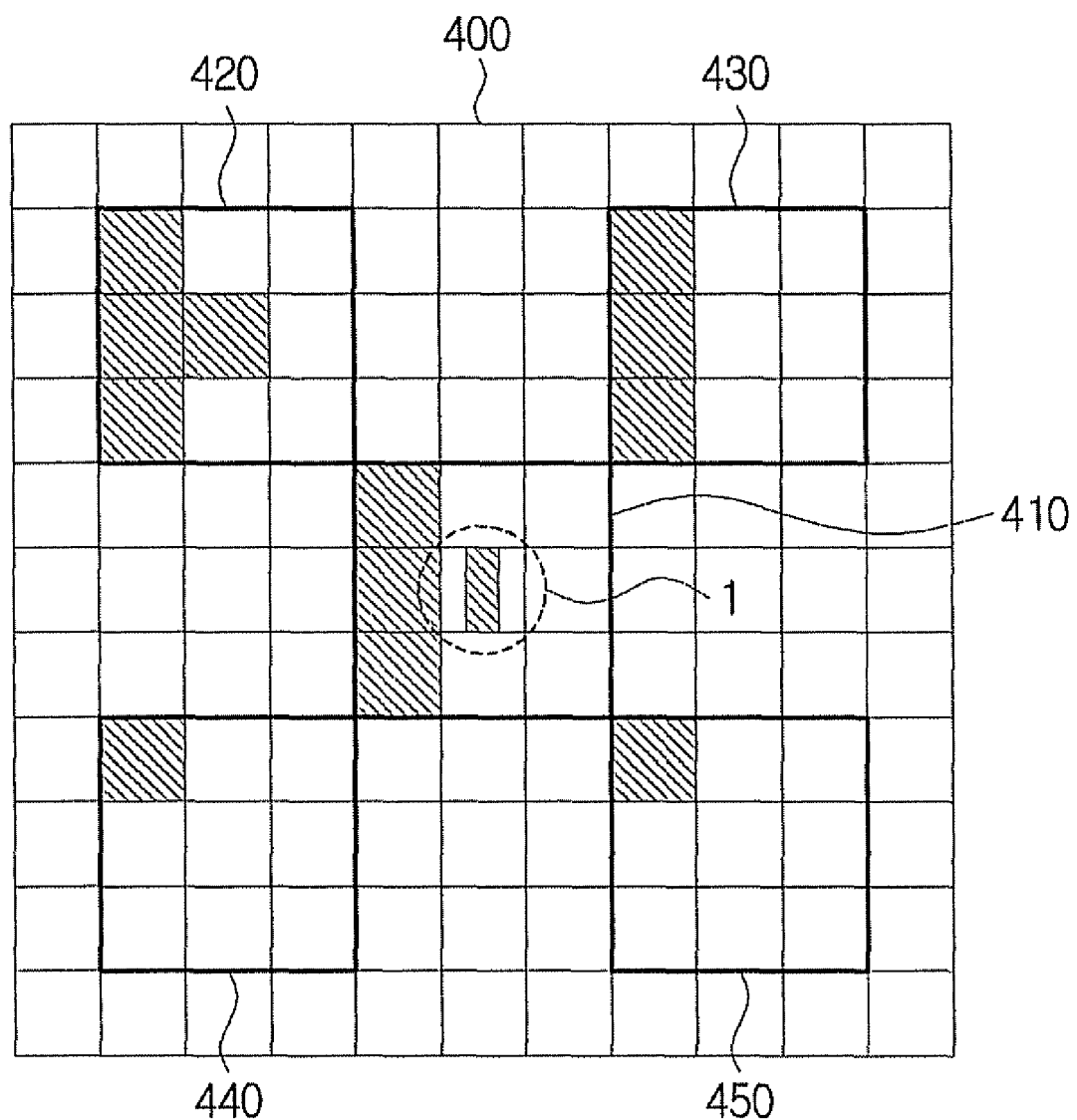

FIG. 7A shows an example where the central reference pixel 1 has a value of 1, indicating a black area. Comparison of patterns between the subwindows 410 to 450 indicates that the first subwindow 410 and the second subwindows 420 and 430 respectively have the same pattern, likewise in FIG. 6A. Accordingly, FIG. 7B shows a dot size of ⅖ for the central reference pixel, since locations 1 and 2 have a pixel value of 1 and location 3 has a pixel value of 0.

Unlike in FIG. 6A, FIG. 7A shows an example where the central reference pixel represents a black region and surrounding reference pixels represent a white region. In this case, an edge may be smoothed and blurred. Calibrating the brightness in the edge area as shown in FIG. 7B will prevent such blurring of an edge area in FIG. 7A.

If a smooth area is determined, the control unit 230 determines the dot size of a central reference pixel depending on whether the central reference pixel and the surrounding reference pixels have a value of "0" or "1". In the case of a smooth area, the first computing unit 232-1 computes the number (Pbn) of the central reference pixel and surrounding reference pixels that are detected by the location detecting unit 212 and that have a dot-forming value.

The second computing unit 232-2 computes the total number (Pn) of the subwindows within the main window. The third computing unit 232-3 computes the dot size of the central reference pixel using the formula Pbn/Pn. The third computing unit 232-3 applies a pulse signal corresponding to the computed dot size to the LSU 240.

Figure 8A:
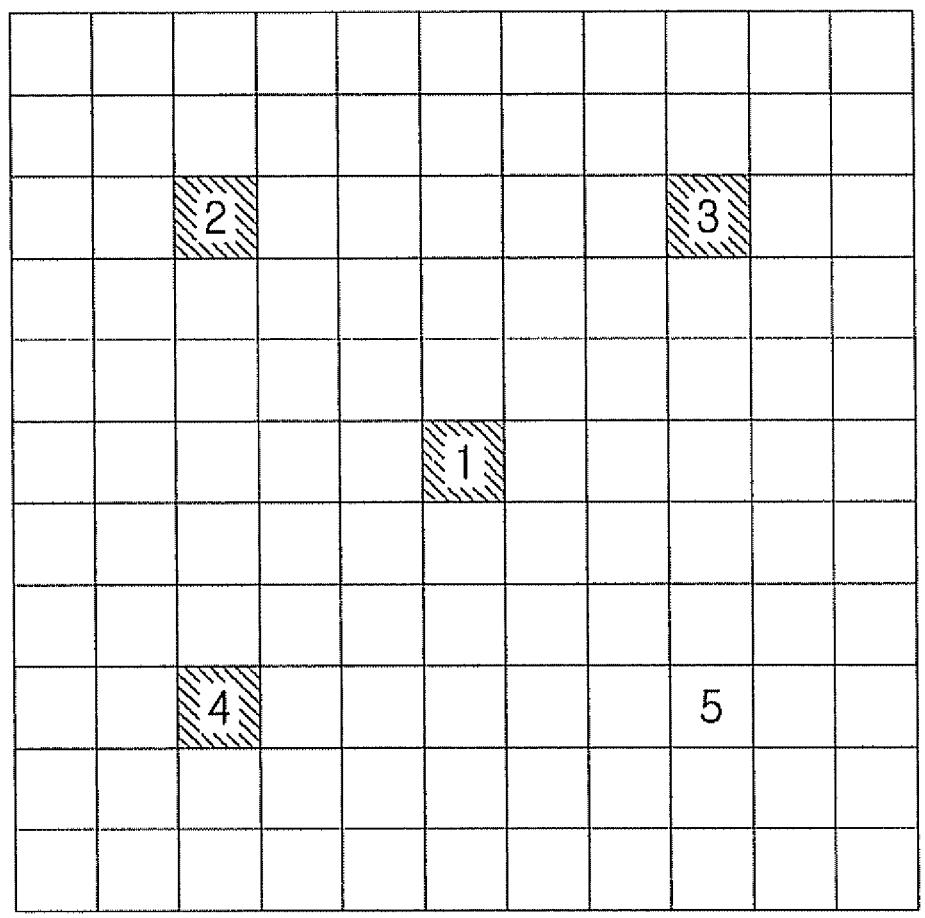
FIGS. 8A and 8B illustrate a process of enhancing image quality of a smooth area according to an embodiment of the present invention.
Figure 8B:
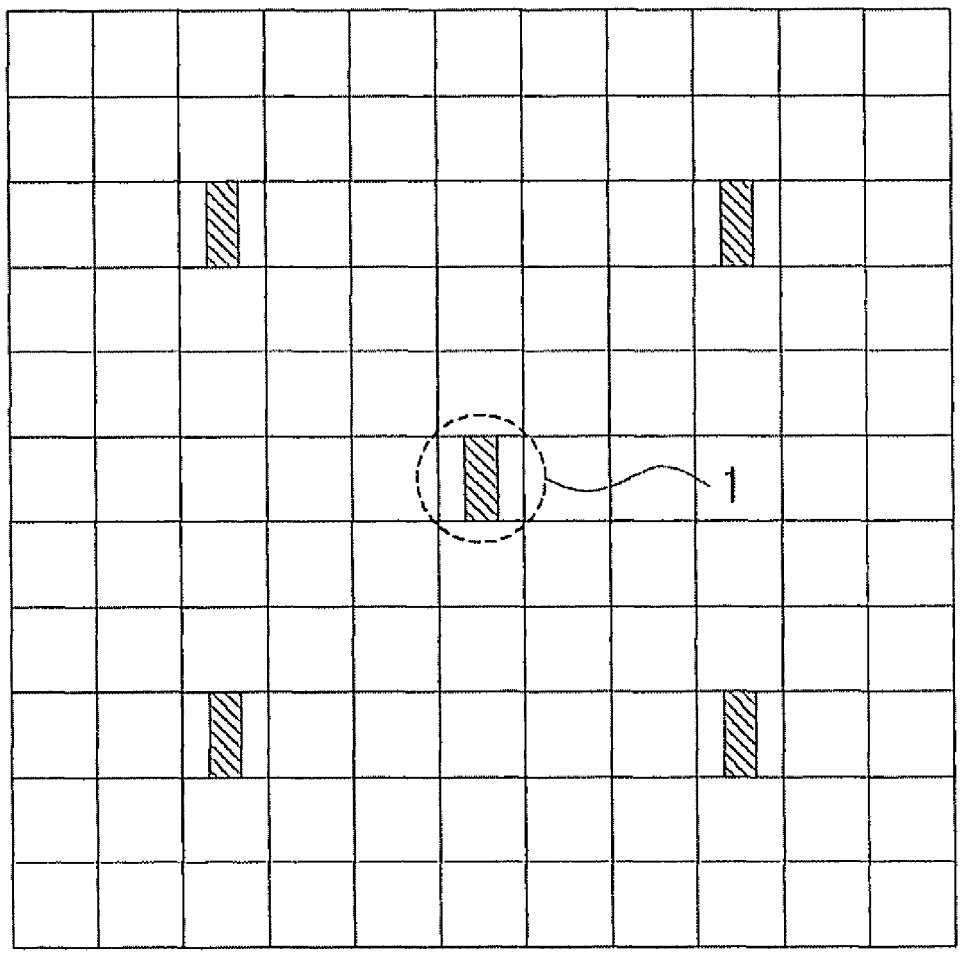

Determining a dot size of a smooth area by the control unit 230 will now be explained below with reference to FIGS. 8A and 8B. FIG. 8A shows location 1 of the central reference pixel and locations 2 to 5 of the surrounding reference pixels. Because four reference pixels have a dot-forming pixel value, the dot size of the central reference pixel 1 is ⅘ as shown in FIG. 8B. The remaining pixels 2-5 are also adjusted to ⅘ size.

Figure 9:
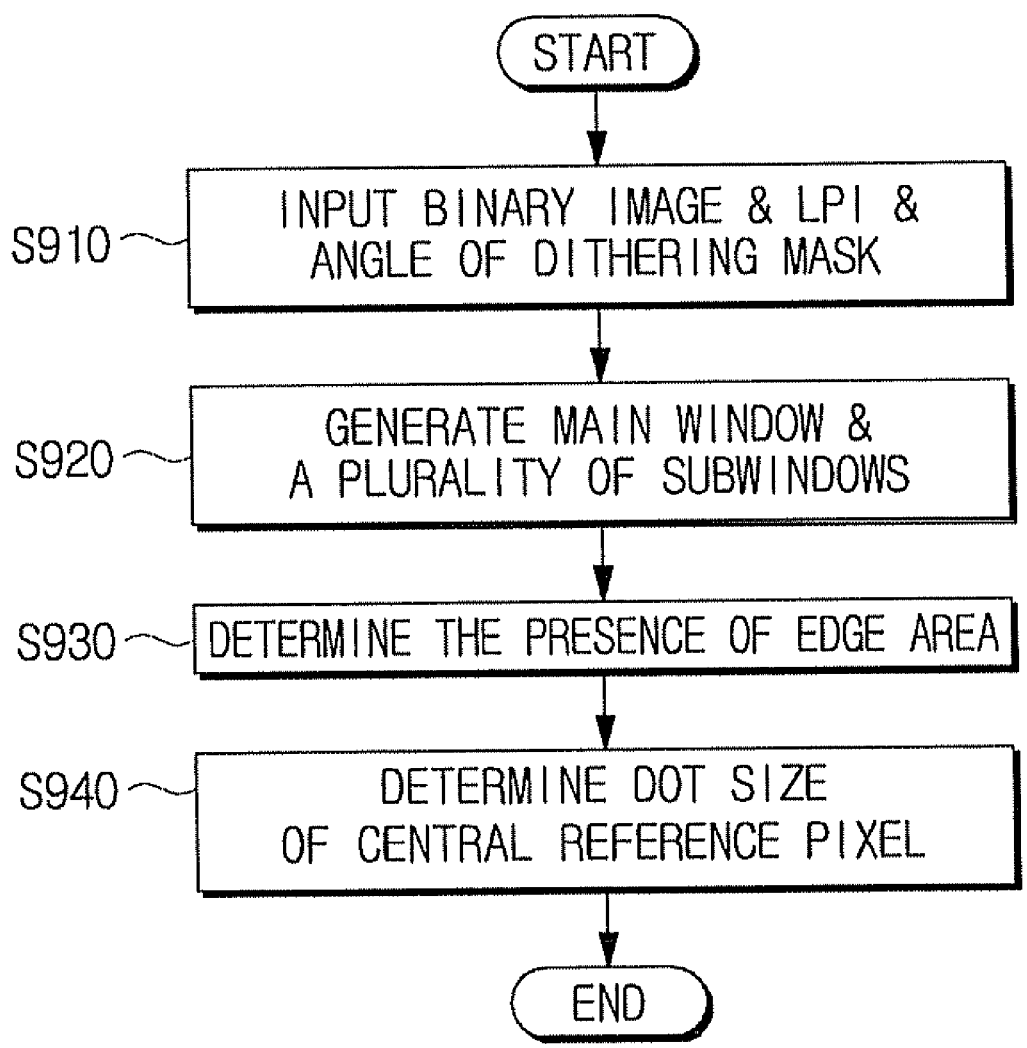
FIG. 9 is a flowchart of an image quality enhancement method of an image forming apparatus according to an embodiment of the present invention.

FIG. 9 is a flowchart of an image quality enhancement process of an image forming apparatus according to an embodiment of the present invention. A binary image and an LPI and an angle of a dithering mask are input at operation S910. At operation S920, the main window 400 and the plurality of subwindows 410 to 450 are generated using the input LPI and angle. The subwindows 410 to 450 are centered around the locations of plurality of reference pixel according to the LPI and the angle, and sized so as not to overlap with each other.

At operation S930, the generated main window 400 is applied to the binary image, pixel values of the pixel locations within each of the subwindows 410 to 450 are compared with each other, and the presence of an edge area is determined. The presence of an edge area is determined without using a dithering mask.

At operation S940, a dot size of the central reference pixel is determined according to the presence of an edge area. If an edge area is determined, a dot size is determined according to a pixel pattern and pixel values of the central reference pixel and the surrounding reference pixels of each of the subwindows 410 to 450. If a smooth area is determined, a dot size is determined according to the pixel values of the central reference pixel and the surrounding reference pixels. As a result, a dot size is determined, and brightness is adjusted according to the characteristics of the edge and smooth areas.

Figure 10:
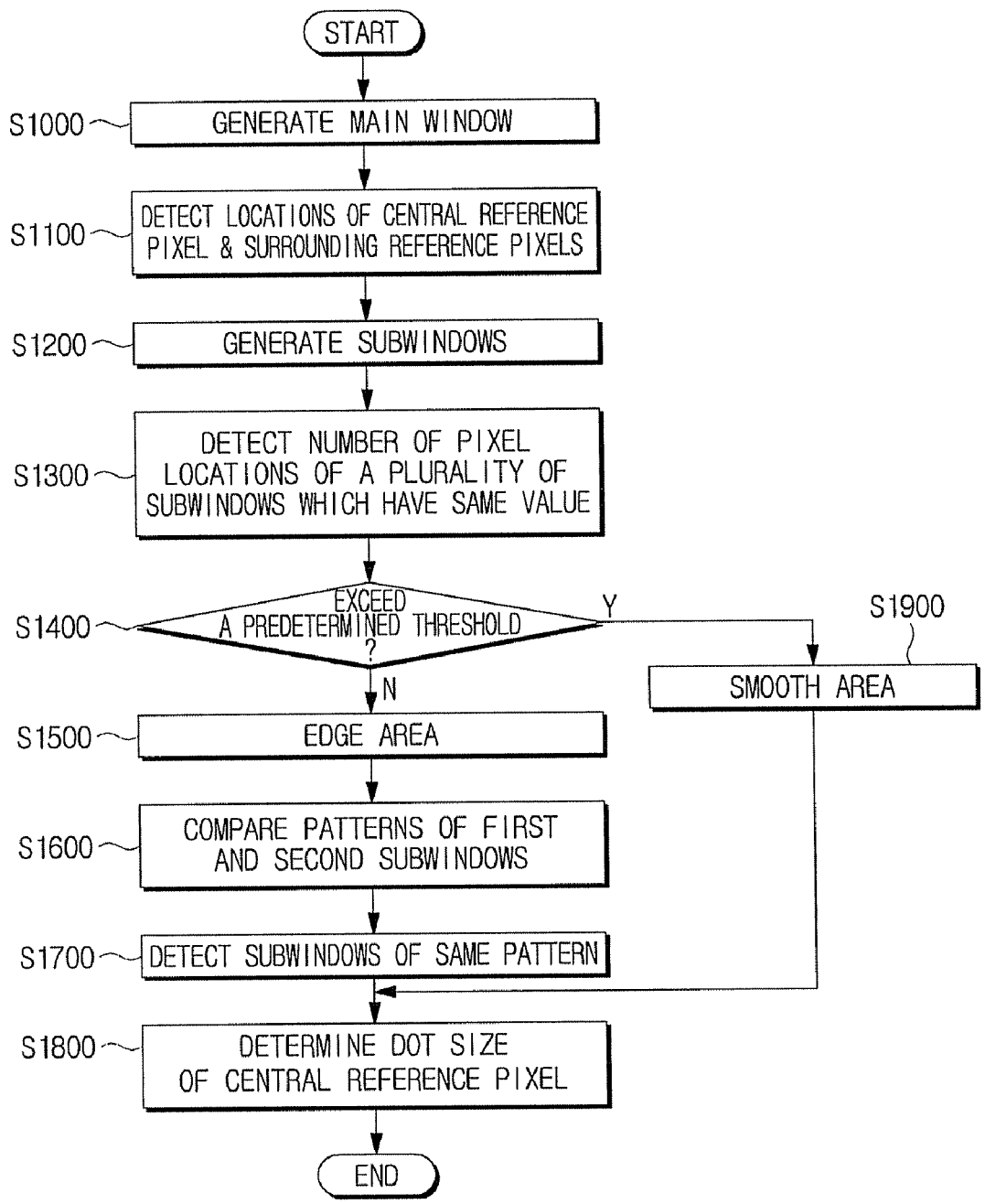
FIG. 10 is a flowchart provided to explain the image quality enhancement method of FIG. 9 in more detail according to an embodiment of the present invention.

FIG. 10 is a flowchart to explain the image quality enhancement process of FIG. 9 in more detail. The main window 400 of a first size is generated based on the LPI and the angle at operation S1000. The locations of the central reference pixel and the surrounding reference pixels are detected at operation S1100.

At operation S1200, the plurality of subwindows 410 to 450 of a second size is generated based on the central reference pixel and the surrounding reference pixel. The generated subwindows 410 to 450 have a size smaller than the first size, and do not overlap with each other.

At operation S1300, pixel values of the pixel locations of the plurality of subwindows 410 to 450 are compared with each other, and the number of pixel locations that have the same value is detected. If the detected number is higher than a predetermined threshold at operation S1400, an edge area is determined at operation S1500. If the detected number if less than the predetermined threshold at operation S1400, a smooth area is determined at operation S1900.

If an edge area is determined at operation S1500, patterns of pixel values of the first subwindow 410 centered around the central reference pixel are compared to patterns of the second subwindows 420 to 450 centered around the surrounding reference pixels at operation S1600. The patterns of the locations may be compared without taking into account the locations of the central reference pixel and the surrounding reference pixels.

At operation S1700, subwindows determined to have the same pattern are detected. The number of reference pixels having a same dot-forming pixel value as the reference pixel at the center of the detected subwindow is also determined.

At operation S1800, a dot size of the central reference pixel is determined using the formula Wbn/Wn, where Wbn refers to the number of detected reference pixels having the same dot-forming pixel value as the center reference pixel, and Wn refers to the number of subwindows located within the main window. The determined dot size is applied to the LSU in the form of a pulse signal, to form an area to be printed. Accordingly, brightness can be adjusted by forming a multi-graylevel dot size according to the edge area and the smooth area. The above formulae are exemplary and not limiting; other factors may be taken into account when determining the dot size.

As explained above, according to aspects of the present invention, patterns of a plurality of subwindows are compared with each other to determine the presence of an edge area, and a dot size of the central reference pixel is determined according to the presence or absence of an edge area. As a result, a multi-graylevel image is expressed with an increased print quality, and image quality is enhanced adaptively according to the characteristics of smooth and edge areas.

Furthermore, usage of memory resources is reduced because the presence of an edge area is determined based on the comparison of patterns between the subwindows that are applied to a binary data, instead of using dithering masks that are otherwise required for each of the colors used.

In addition, aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus, comprising:
a window generating unit to generate a main window of a predetermined size with a central reference pixel within a binary image and to generate a plurality of subwindows within the main window based on locations of a plurality of surrounding reference pixels;
a determining unit to detect whether the main window has an edge area of the binary image by applying the plurality of generated subwindows to the binary image and according to pixel values of the binary image that correspond to the subwindows; and
a control unit to determine a dot size of the central reference pixel according to a presence or absence of the edge area as detected by the determining unit,
wherein the subwindows are sized so as not to overlap with each other.

2. The image forming apparatus of claim 1, wherein the determining unit comprises:
a pattern determining unit to determine whether the pixel values of the binary image are uniform at the corresponding pixel locations in the plurality of subwindows; and
an area determining unit to determine the presence of an edge area if a number of the pixel locations having the same pixel value in the subwindows is less than a predetermined threshold, and to determine the presence of a smooth area if the number of the pixel locations having the same pixel value in the subwindows is higher than the predetermined threshold.

3. The image forming apparatus of claim 1, wherein the window generating unit comprises:
a main window generating unit to generate the main window;
a location detecting unit to detect the locations of the surrounding reference pixels around the central reference pixel located within the main window, using Lines Per Inch (LPI) and an angle; and a subwindow generating unit to generate the subwindows having a predetermined size centered around the detected location of the surrounding reference pixels and the location of the central reference pixel.

4. The image forming apparatus of claim 3, wherein the control unit comprises:
a pattern detecting unit to compare pixel values of the pixel locations belonging to a first subwindow that includes the location of the central reference pixel to pixel values of the pixel locations belonging to the second subwindows that include the locations of the surrounding reference pixels, except for the locations of the reference pixels in each subwindow, and to detect subwindows having the same pattern, if the binary image corresponding to the main window is determined to have the edge area; and
a dot size determining unit to determine a dot size of the location of the central reference pixel according to the pixel value of the binary image that corresponds to the location of the central reference pixel or the locations of the surrounding reference pixels included in the detected subwindows.

5. The image forming apparatus of claim 4, wherein the dot size determining unit comprises:
a first computing unit to compute a number (Wbn) of the plurality of subwindows that include a dot-forming pixel value at the central reference pixel and the surrounding reference pixels;
a second computing unit to compute a total number (Wn) of subwindows within the main window; and
a third computing unit to compute a dot size of the central reference pixel using the formula Wbn/Wn.

6. The image forming apparatus of claim 4, wherein the location of the central reference pixel is at the center of the first subwindow, and the locations of the surrounding reference pixels are at the centers of the corresponding second subwindows.

7. The image forming apparatus of claim 3, wherein the control unit comprises:
a first computing unit to compute a number (Pbn) of reference pixels having a dot-forming pixel value at the detected central reference pixel and surrounding reference pixels, if a binary image corresponding to the main window is determined to be a smooth area of the binary image as opposed to the edge area;
a second computing unit to compute a total number (Pn) of subwindows within the main window; and
a third computing unit to compute a dot size of the central reference pixel using the formula Pbn/Pn.

8. An image quality enhancement method, comprising:
receiving a binary image and Lines Per Inch (LPI) and an angle of a dithering mask;
generating a main window of a predetermined size with a central reference pixel within the binary image and generating a plurality of subwindows within the generated main window based on locations of a plurality of surrounding reference pixels;
determining if the main window includes an edge area of the binary image by applying the plurality of generated subwindows to the binary image and according to pixel values of the binary image corresponding to the subwindows; and
determining a dot size of the central reference pixel according to whether it is determined that the main window includes the edge area,
wherein the subwindows are sized so as not to overlap with each other.

9. The image quality enhancement method of claim 8, wherein the determining the presence of an edge area comprises:
determining whether the pixel values of the binary image are uniform at corresponding pixel locations included in the plurality of subwindows; and
determining the presence of the edge area if a number of the pixel locations having the same pixel value in the subwindows is less than a predetermined threshold, and determining the presence of a smooth area if the number of the pixel locations having the same pixel value in the subwindows is higher than the predetermined threshold.

10. The image quality enhancement method of claim 8, wherein the generating of the main window comprises:
generating the main window;
detecting the locations of the surrounding reference pixels around the central reference pixel located within the main window, using the received LPI and angle; and
generating subwindows of a predetermined size that are centered around the detected location of the surrounding reference pixels and the location of the central reference pixel.

11. The image quality enhancement method of claim 10, wherein the generating of the subwindows comprises:
comparing pixel values of the pixel locations belonging to a first subwindow that includes the location of the central reference pixel to the pixel locations belonging to second subwindows that include the locations of the surrounding reference pixels, other than the locations of the reference pixels in each subwindow, and to detect the subwindows having the same pattern, if a binary image corresponding to the main window is determined to have the edge area; and
determining a dot size of the location of the central reference pixel according to the pixel value of the binary image corresponding to the location of the central reference pixel or the locations of the surrounding reference pixels included in the detected subwindows.

12. The image quality enhancement method of claim 11, wherein the determining a dot size comprises:
computing a number (Wbn) of subwindows that include a dot-forming pixel value at the central reference pixel and the surrounding reference pixels;
computing a total number (Wn) of subwindows within the main window; and
computing a dot size of the central reference pixel using a mathematical formula, Wbn/Wn.

13. The image quality enhancement method of claim 11, wherein the location of the central reference pixel is the center of the first subwindow, and the locations of the surrounding reference pixels are the centers of the corresponding second subwindows.

14. The image quality enhancement method of claim 10, wherein the subwindow generating comprises:
computing a number (Pbn) of reference pixels having a dot-forming pixel value at the detected central reference pixel and surrounding reference pixels, if a binary image corresponding to the main window is determined to be a smooth area of the binary image as opposed to the edge area;
computing a total number (Pn) of subwindows within the main window; and
computing a dot size of the central reference pixel using the formula Pbn/Pn.

15. An image forming apparatus, comprising:
a video controller to apply a plurality of subwindows based on locations of a plurality of reference pixels to a binary image to be printed, to determine the presence of an edge area in each subwindow according to binary image pixel values corresponding to the subwindows, and to determine a dot size of a central reference pixel according to the determination as to whether the subwindow includes the edge area; and an engine unit to express the binary image on a multi-gray-level by printing the binary image according to the determined dot size, wherein the subwindows are sized so as not to overlap with each other.

16. An image forming apparatus comprising:

a window generating unit to generate a plurality of windows including a central reference pixel at the center of each window and a plurality of surrounding reference pixels;

a determining unit to detect, within each window, an edge area or a smooth area based on pixel values of a binary image that correspond to the window;

a control unit to select a calculation method for a dot size of the central reference pixel at the center of each window based on whether the window includes the edge area or the smooth area, and to determine the dot size based on the selected calculation method; and a printing unit to form an image onto a printable medium based on the binary image and the dot sizes determined by the control unit.

17. The image forming apparatus of claim 16, wherein the determining unit does not use the dithering mask when detecting the edge area or the smooth area.

18. The image forming apparatus of claim 16, wherein:

if the determining unit detects the edge area in the window, the control unit determines the dot size of the central reference pixel based on a pixel pattern, pixel values of the central reference pixel, and pixel values of the surrounding reference pixels of each of a plurality of subwindows in the window; and if the determining unit detects the smooth area in the window, the control unit determines the dot size of the central reference pixel based on the pixel values of the central reference pixel and the pixel values of the surrounding reference pixels.

19. A method of enhancing quality of an image to be printed, the method comprising:

generating a main window having a central reference pixel and a plurality of subwindows of the main window having a plurality of surrounding reference pixels based on lines per inch (LPI) and an angle of a dithering mask;

applying the plurality of subwindows to a binary image corresponding to the image to be printed;

detecting the presence of an edge area or a smooth area based on values of pixels at pixel locations within each of the subwindows; and determining a dot size of the central reference pixel based on whether the presence of an edge area or the presence of a smooth area has been detected, wherein the subwindows are sized so as not to overlap with each other.

20. The method of claim 19, wherein the generating of the main window and the plurality of subwindows comprises:

detecting pixel locations of the central reference pixel and the surrounding reference pixels; and generating the main window and the plurality of subwindows based on the detected pixel locations.

21. The method of claim 20, wherein the detecting of the edge area or the smooth area comprises:

determining a number of corresponding pixel locations of each of the plurality of subwindows that have the same pixel value;

detecting the presence of an edge area if the number of pixel locations is greater than a predetermined threshold; and detecting the presence of a smooth area if the number of pixel locations is less than or equal to the threshold.

22. The method of claim 21, wherein the determining of the dot size comprises:

determining the dot size as Wbn/Wn if an edge area is detected, where Wbn is a number of subwindows having a dot-forming pixel value at the central reference pixel and the surrounding reference pixels, and Wn is the number of the plurality of subwindows; and determining the dot size as Pbn/Pn if a smooth area is detected, where Pbn is the number of reference pixels having a dot-forming pixel value at the central reference pixel and the surrounding reference pixel, and Pn is the number of subwindows within the main window.

23. The method of claim 19, wherein the plurality of subwindows are each smaller than the main window.

* * * * *